United States Patent
Bonacci

[11] Patent Number: 5,946,990
[45] Date of Patent: Sep. 7, 1999

[54] DRAIN ASSEMBLY REMOVAL TOOL AND METHOD

[76] Inventor: Anthony S. Bonacci, 217 Fifth Ave., West Mifflin, Pa. 15122

[21] Appl. No.: 08/992,364

[22] Filed: Dec. 17, 1997

[51] Int. Cl.[6] .......................... B25B 13/48; B23D 21/06; B27B 21/00
[52] U.S. Cl. .......................... 81/176.15; 30/103; 30/107; 30/502; 30/503.5; 30/519
[58] Field of Search .......................... 81/176.15; 30/107, 30/103, 105, 502, 503.5, 519, 92.5

[56] References Cited

U.S. PATENT DOCUMENTS

| | | |
|---|---|---|
| 482,496 | 9/1892 | Coppage . |
| 828,120 | 8/1906 | Jones . |
| 943,323 | 12/1909 | Sorensen ................................. 30/107 |
| 1,352,638 | 9/1920 | Thompson . |
| 1,643,638 | 9/1927 | Dunham . |
| 2,659,256 | 11/1953 | Palmer . |
| 2,782,820 | 2/1957 | Dreier ....................................... 30/502 |
| 2,814,105 | 11/1957 | Smith ....................................... 30/105 |
| 3,010,347 | 11/1961 | Kron ..................................... 81/176.15 |
| 3,798,687 | 3/1974 | Stevens . |
| 5,103,698 | 4/1992 | Delaney . |

*Primary Examiner*—David A. Scherbel
*Assistant Examiner*—Philip J. Hoffmann
*Attorney, Agent, or Firm*—Douglas G. Glantz

[57] ABSTRACT

A drain assembly removal tool and method are disclosed for removing a drain assembly, including providing a hand grip, two prongs extending from the hand grip, and cutting means attached to at least one prong for cutting into a strainer plug body of a drain assembly. In one aspect, an adjustable saw blade includes a multi-position slot for mounting the saw blade to the prong for providing adjustment to contact the saw blade to the strainer plug body of the bathtub drain. In one aspect, a serrated helical wheel provides adjustment to contact the saw blade to the strainer plug body of the bathtub drain. In another aspect, an adjustable cutter wheel includes a serrated helical wheel for providing adjustment to contact the cutter wheel to the strainer plug body of the bathtub drain.

14 Claims, 6 Drawing Sheets

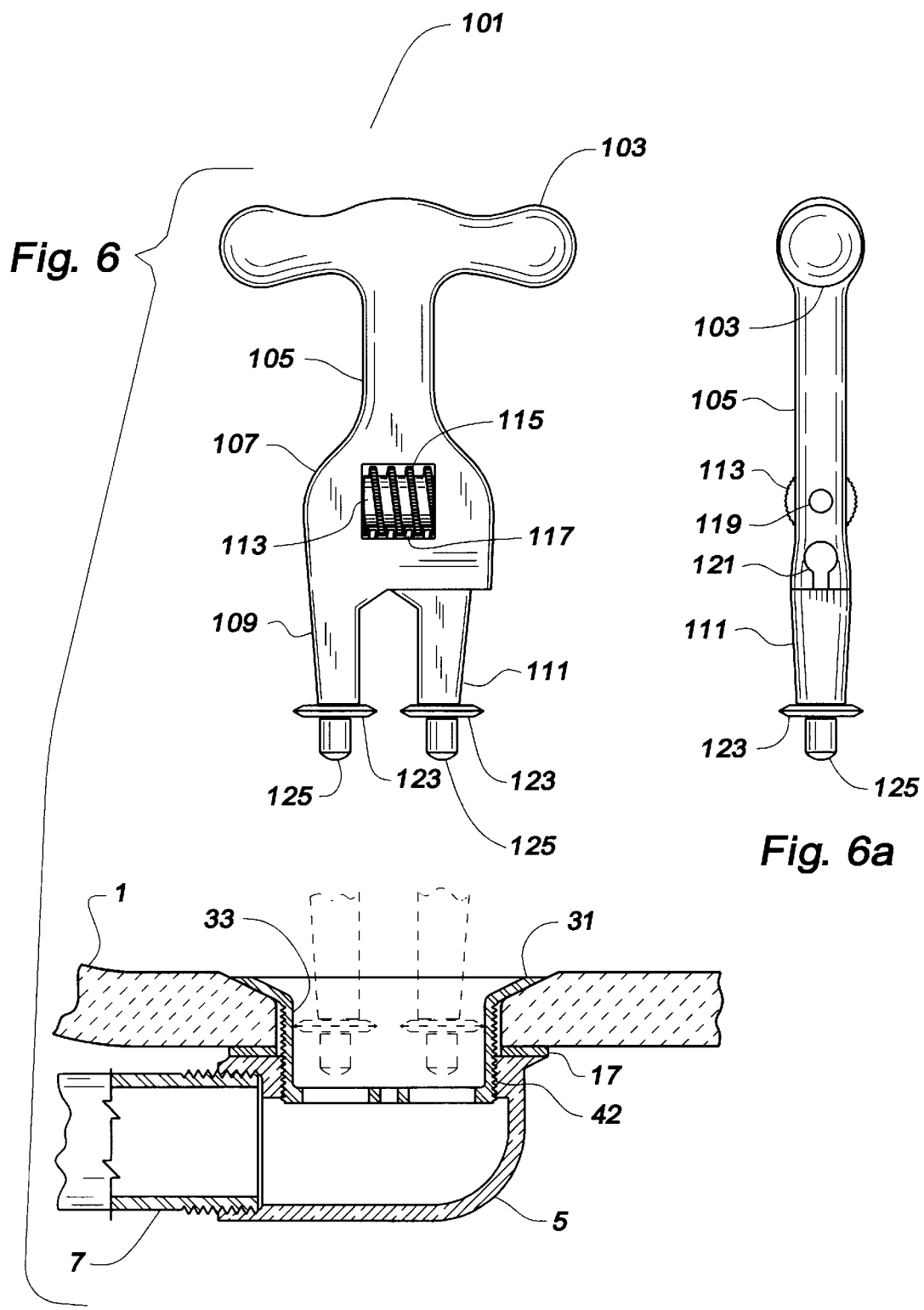

DRAIN ASSEMBLY REMOVAL TOOL AND METHOD

BACKGROUND OF THE INVENTION

1. Field of the Invention

This invention relates to a drain assembly removal tool and a method of removing a drain assembly. In one aspect, this invention relates to a bathtub drain assembly removal tool and a method of removing a bathtub drain assembly from a tub.

2. Background of the Invention

A conventional two prong screw-out bathtub drain assembly removal tub tool is designed to remove a bathtub drain by extending down into the bathtub drain and engaging a strainer plug body. Two elongated prongs or fingers of the tool are shaped to fit between spokes in the bottom of the strainer plug body. The tool is then turned, i.e., counterclockwise, to loosen a threaded connection between the strainer plug body and a drain fitting below the bathtub. After the strainer plug body is separated from the drain fitting, the drain piping is easily removed from the bathtub.

INTRODUCTION TO THE INVENTION

In many cases in the actual practice of removing the bathtub drain assembly from the tub, the strainer plug body threads are corroded so that a great deal of turning effort is exerted against the spokes, which spokes often break away from the strainer plug body before it begins to turn. In cases such as this, the prior art tool is rendered ineffective, because without lot the four spokes, little turning effort can be imparted to the strainer plug body. As a last resort, a hammer and chisel or "Sawzall" electric reciprocating saw is required to remove the strainer plug body. Either of these methods is difficult and can scratch the bathtub.

A new bathtub drain assembly removal tool is needed which provides for the removal of a corroded bathtub drain assembly easily and effectively.

A general object of this invention is to provide a tub tool and method for removing a corroded bathtub drain assembly.

It is a more specific object of the present invention to provide a tub tool and method for removing a corroded bathtub drain assembly easily and effectively.

These and other objects and advantages of the present invention will become more apparent to those skilled in the art in view of the following detailed description and the accompanying drawings.

SUMMARY OF THE INVENTION

A drain assembly removal tool and method of the present invention for removing a drain assembly include providing a hand grip, two prongs extending from the hand grip, and cutting means attached to at least one prong for cutting into a strainer plug body of a drain assembly.

In one aspect, an adjustable saw blade includes a multi-position slot for mounting the saw blade to the prong for providing adjustment to contact the saw blade to the strainer plug body of the bathtub drain. In one aspect, a serrated helical wheel provides adjustment to contact the saw blade to the strainer plug body of the bathtub drain.

In another aspect, an adjustable cutter wheel includes a serrated helical wheel for providing adjustment to contact the cutter wheel to the strainer plug body of the bathtub drain.

BRIEF DESCRIPTION OF THE DRAWINGS

FIG. 6 is a front elevation view of the drain assembly, shown in cross section, and a novel cutter having two arms with a cutter wheel at a base of each arm.

FIG. 6a is a side elevation of the novel cutter tool shown in FIG. 6.

DETAILED DESCRIPTION OF THE PREFERRED EMBODIMENTS

A novel bathtub drain assembly removal tool and a method of removing the bathtub drain assembly from a tub are disclosed. The tub tool and drain assembly removal method of the present invention relate primarily to the removal of a bathtub drain assembly that has become corroded so that removal of the drain assembly from the tub by conventional methods is very difficult and time consuming. The invention includes several embodiments of a novel tool which I have found to be much more effective than prior art tools in freeing corroded bathtub drain assemblies.

The invention includes apparatus and method in the following embodiments. A hacksaw blade is added to at least one of the prongs, and preferably both of the prongs, of a two-arm tub tool. A hacksaw blade tub tool includes a hacksaw blade which is adjustable in the manner of a multi-position slot adjustment. The blade is adjusted or set to touch the inner diameter of the strainer. A hacksaw blade tub tool provides hacksaw blade arms which are adjustable in the manner of a helical wheel adjustment. The blades are adjusted or set to touch the inner diameter of the strainer plug body. The tool is then struck with a hammer that causes the blades to score and cut through the strainer plug body. The blades can be adjusted out farther and the tool struck again with a hammer to deepen the cut through the strainer plug body for removal. A cutter has two arms and a cutter wheel at the base of each arm. The two arm cutter is adjustable to touch the inner diameter of the strainer plug body and then to be adjusted out farther to deepen the cut through the strainer plug body for removal.

The present invention provides means for removing corroded bathtub drain assemblies quickly and easily from the bathtub.

Figure 1:
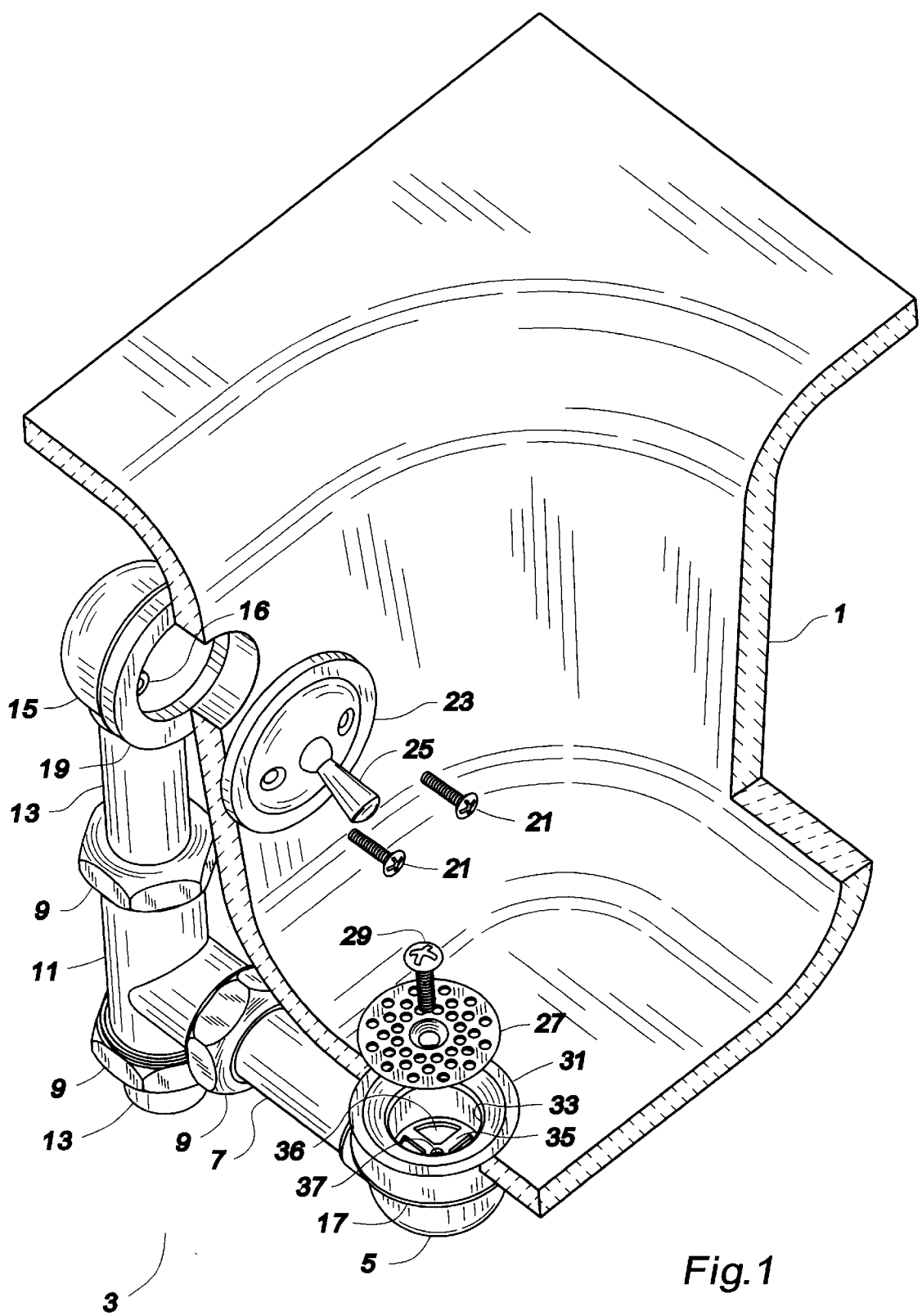
FIG. 1 is a perspective view, partially in section and partially exploded, of a typical trip lever bathtub drain assembly.

Referring now to FIG. 1, which depicts a typical trip no lever bath drain assembly, a majority of the drain assembly components may be removed as an assembly 3 from underneath a bathtub 1 following disassembly of several components from a top side of the tub. It should be understood that any or all of the components of drain assembly 3 may be disassembled individually. However, removal as an assembly is the preferred method because it saves time. The components to be removed from underneath the bathtub 1 as an assembly 3 typically include an internally threaded fitting 5, herein referred to as a shoe elbow 5, a tailpiece 7, coupling nuts 9 containing slip joint washers (not shown), a tee 11, tubes 13, and a top elbow 15. The assembly is sealed to the bathtub 1 by a rubber washer 17 and a beveled washer 19 which are removed individually from the bathtub 1 following removal of the drain assembly 3.

The components to be removed from the top side of the bathtub 1 typically include screws 21 and a faceplate 23 that secure a trip lever handle 25 which is connected to a linkage and plunger (not shown), a strainer plate 27, and a screw 29. These components are generally easy to remove. Before the drain assembly 3 can be removed from bathtub 1, the strainer plug body 31 must be removed from a shoe elbow 5 by turning (i.e., counterclockwise) to loosen the threaded connection between the strainer plug body 31 and the shoe elbow 5 below. This operation is usually difficult to perform because of corrosion, and it is the purpose of the present invention to save time and effort as well as to protect the bathtub 1 by efficiently removing a strainer plug body 31 from the shoe elbow 5 of the drain assembly 3.

It should be realized that a drain assembly may contain a greater or lesser number of components than those described above, and different components may be encountered other than those shown in FIG. 1. The present invention is used in any situation where threaded drain components such as those referred to herein as the strainer plug body 31 and the shoe elbow 5 are to be removed from a plumbing fixture, herein referred to as the bathtub 1. The drain assembly need not include an internal or external mechanism such as the trip lever, linkage, and plunger mentioned above. The invention is not limited to the removal of bathtub drains and conceivably could be used to remove other types of drains such as shower drains or sink drains, or could be used in any situation where the novel tool described herein may be used to separate plumbing components whose nature and geometry are such that the novel tub tool may be employed to remove such components.

Figure 2:
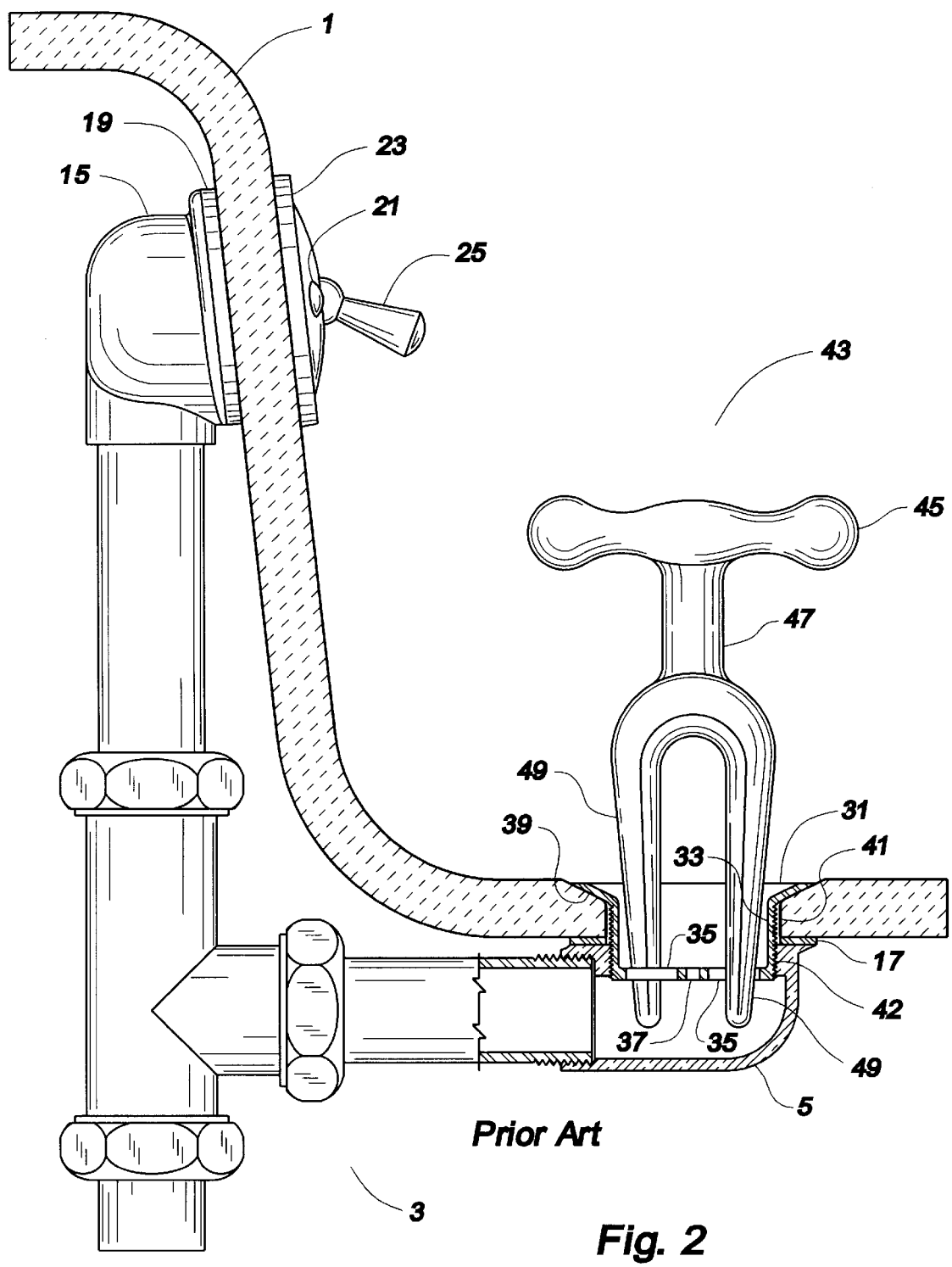
FIG. 2 is a front elevation view, partially in section, of the typical trip lever bathtub drain assembly showing a prior art tub tool in its working position.

Referring to FIG. 1 and FIG. 2, a prior art tool 43 is often of one piece construction and includes a handle 45, a shank 47, and prongs 49. Following the removal of a screw 29 from a threaded hole 37 in strainer plug body 31, a strainer plate 27 is removed from the tub drain. This operation is typically easy to accomplish as is the removal of screws 21 from threaded holes 16 in top elbow 15. Following the removal of the above components, as well as faceplate 23 and trip lever 25 with its linkage and plunger (not shown), the strainer plug body 31 must be removed from shoe elbow 5. The prongs 49 of prior art tool 43 are inserted into two openings 36 between the spokes 35 of strainer plug body 31, and the tool 43 is turned (i.e. counterclockwise) to loosen the threaded connection between strainer plug body 31 and shoe elbow 5, and to remove strainer plug body 31 from opening 41 in tub 1. Soft plumber's putty 39 is usually present between tub 1 and strainer plug body 31 which presents no appreciable resistance to the effort required to turn strainer plug body 31. However, if a different sealant was used such as silicone rubber, the necessary turning effort could be increased significantly. Corrosion of the threaded connection 42 of strainer plug body 31 and shoe elbow 5 is almost always encountered which adds greatly to the turning effort required to turn strainer plug body 31 to remove it from shoe elbow 5. The turning effort required to loosen strainer plug body 31 is usually so great that spokes 35, which may be weakened by corrosion, break away from the inner diameter 33 of strainer plug body 31. When spokes 35 break away from strainer plug body 31, the prior art tool 43 has no further usefulness because prongs 49 may bottom against shoe elbow 5 preventing contact of prongs 49 with inner diameter 33 of strainer plug body 31. In other cases where contact is possible between prongs 49 of tub tool 43 and the inner diameter 33 of strainer plug body 31, the smooth outer surfaces of prongs 49 slip against inner diameter 33 of strainer plug body 31 so that the prior art tool 43 once again has no further usefulness. As a last resort, a hammer and chisel or "Sawzall" reciprocating saw is required to remove the strainer plug body 31, which is difficult and often scratches the bathtub 1. The prior art tub tool's usefulness is therefore limited primarily to installation, but not removal of the strainer plug body 31 from shoe elbow 5.

Figures 3, 3A, 3B:
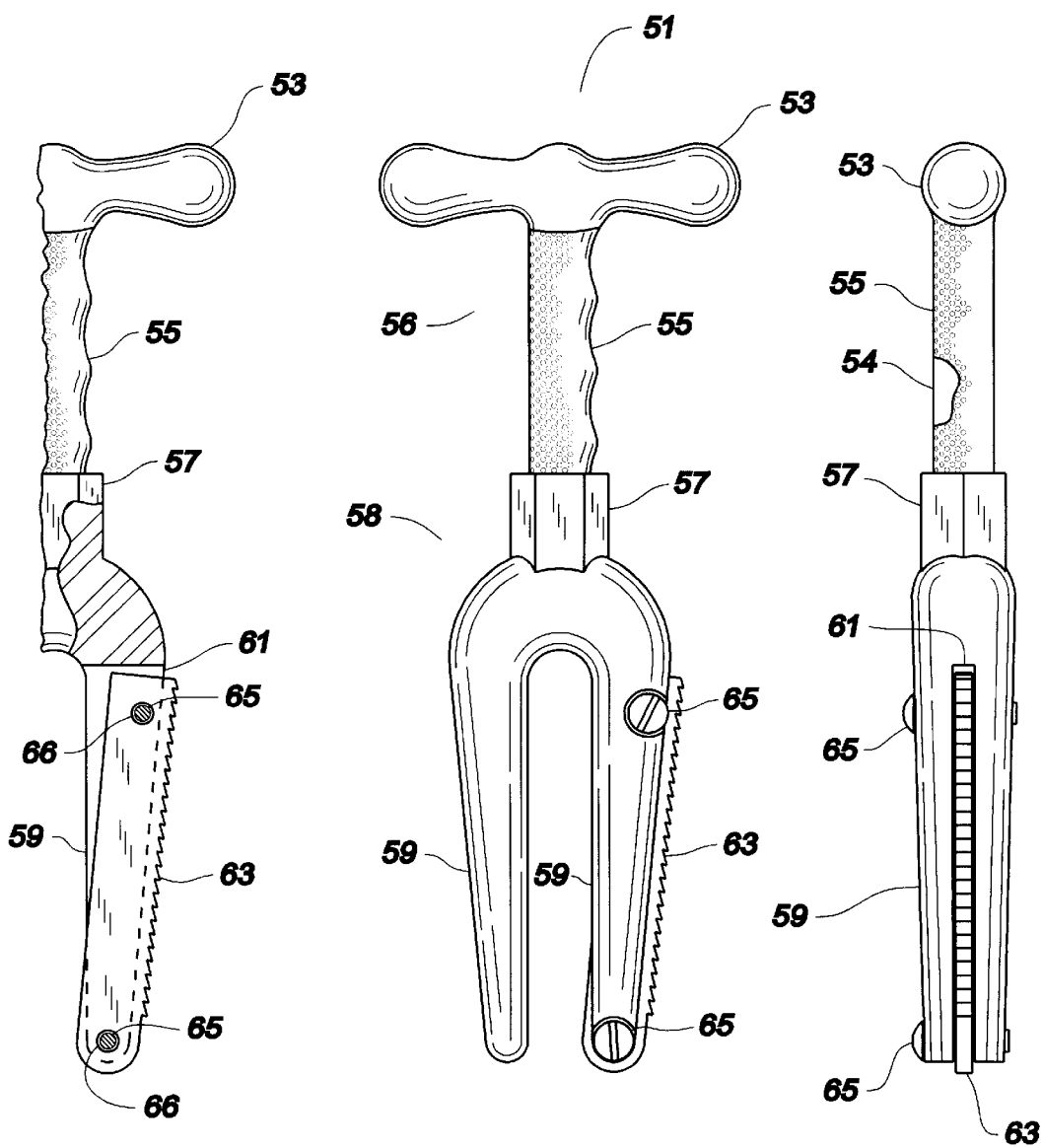
FIG. 3 is a front elevation view of a novel tub tool of the present invention with a hacksaw blade added to one of the prongs of the two-prong tub tool.
FIG. 3a is a front elevation view, partially in section, of the tool showing details of the blade attachment.
FIG. 3b is a side elevation view of the novel tub tool shown in FIG. 3.

FIGS. 3, 3a, and 3b show a novel tub tool 51 with an upper portion 56 consisting of handle 53, shank 54, and cushion grip material 55. Lower portion 58 includes primarily hexagonal region 57 and two prongs 59. The upper portion 56 may be assembled to lower portion 58 after application of cushion grip material 55 by any known means able to provide a permanent rigid connection such as threading and pinning or a keyed press fit. If cushion grip material 55 is applied by stretching over handle 53 or wrapping around and bonding to shank 54 as with a suitable adhesive, tool 51 may be manufactured as one piece as by casting or forging. Alternately, upper portion 54 may be joined to lower portion 58 by a permanent process such as welding or brazing prior to assembly of cushion grip material 55. In any case, the main portions of the tool 51, upper portion 56 and lower portion 58, are to be considered for structural purposes as one piece and are to be made of a strong durable material such as steel.

FIGS. 3a and 3b depict slot 61 that is machined into at least one and preferably both prongs 59 of novel tub tool 51. Blade 63 is shown mounted to one prong 59 of tool 51 and preferably to both prongs 59 by means of screws 65 that pass through holes 66 in blade 63. Holes in prong 59 are partially threaded so that the threads of screws 65 do not engage with threads in prong 59 until passing through holes 66 in blade 63. Blade 63 is a hacksaw blade.

Novel tub tool 51 is firmly grasped by cushion grip 55 and used in the manner of a jab saw to cut into and engage firmly with inner diameter 33 of strainer plug body 31. By engaging firmly with inner diameter 33 of strainer plug body 31, novel tub tool 51 is able to impart more turning effort to strainer plug body 31 than the prior art tool. Novel tub tool 51 may be turned either by handle 53 or by means of a wrench, preferably ¾" open end, on hexagonal region 57. If two blades 63 are used, additional turning effort can be exerted, and the reach of blades 63 can extend out to a larger inner diameter 33 of strainer plug body 31. If one blade 63 is used, the novel tub tool 51 will fit into a smaller inner diameter 33 of strainer plug body 31. The outer taper of prongs 59 permits blades 63 to be mounted at a matching angle as shown in FIG. 3. Whether one or two blades 63 are used, the taper of prongs 59 and the mounting angle of blades 63 allow the novel tub tool 51 to fit a wider range of inner diameters 33 of strainer plug bodies 31.

Figures 4, 4A, 4B:
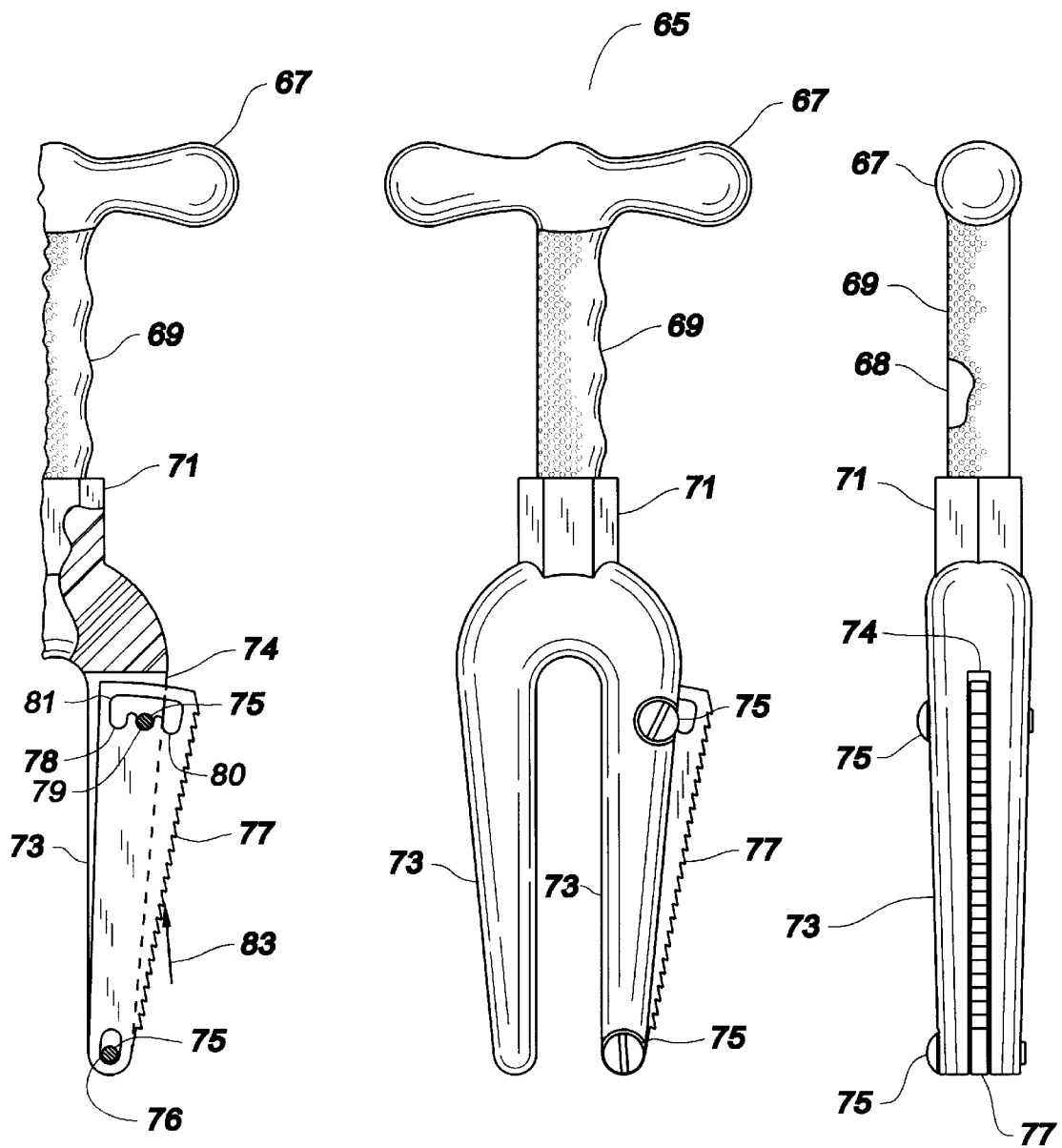
FIG. 4 is a front elevation view of a novel hacksaw blade tub tool wherein a hacksaw blade is adjustable in the manner of a multi-position slot adjustment.
FIG. 4a is a front elevation view, partially in section, of the tool showing details of a blade attachment.
FIG. 4b is a side elevation view of the novel tub tool shown in FIG. 4.

FIGS. 4, 4a, and 4b show a novel tub tool 65 similar in construction and use to the tub tool 51 shown in FIG. 3. A hacksaw blade tub tool is shown wherein the hacksaw blade is adjustable in the manner of a multi-position slot adjustment. The blade is adjusted or set to touch the inner diameter of the strainer plug body. Handle 67, shank 68, grip 69, hexagonal region 71, prongs 73, slots 74, and screws 75 can be identical to the corresponding components of novel tub tool 51 shown in FIG. 3. Novel blade 77 is moveable in the manner of a multi-position slot adjustment and enables the novel tub tool to fit into an even wider range of inner diameters 33 of strainer plug bodies 31.

Blade 77 is shown mounted to one prong 73 of tool 65 and preferably to both prongs 73 by means of screws 75 which pass through slot 76 and opening 81 in blade 77. Blade 77 is shown mounted to one prong 73 of tool 65 through a multi-position slot, e.g., such as slot 78, 79, or 80, for mounting the blade 77 to prong 73. Holes in prong 73 are partially threaded so that the threads of screws 75 do not engage with threads in prong 73 until passing through slot 76 and opening 81 in blade 77. Slot 76 permits blade 77 to be moved downward for adjustment after lower screw 75 has been loosened. During adjustment, upper opening 81 allows the blade 77 to pivot about lower screw 75. To complete the adjustment process, blade 77 is moved back up so that upper screw 75 enters either slot 78, 79, or 80. Tightening lower screw 75 closes the lower portion of slot 74 against blade 77, effectively locking the blade into position. During use as a jab saw, inner diameter 33 of strainer drain plug 31 exerts an upward force 83 against the teeth of blade 77. Upward movement of the blade is prevented because screws 75 are bottomed in slots 76, 78, 80, and 81. Downward movement of the blade is possible for adjustment purposes only, after first loosening lower screw 75.

Figures 5, 5A:
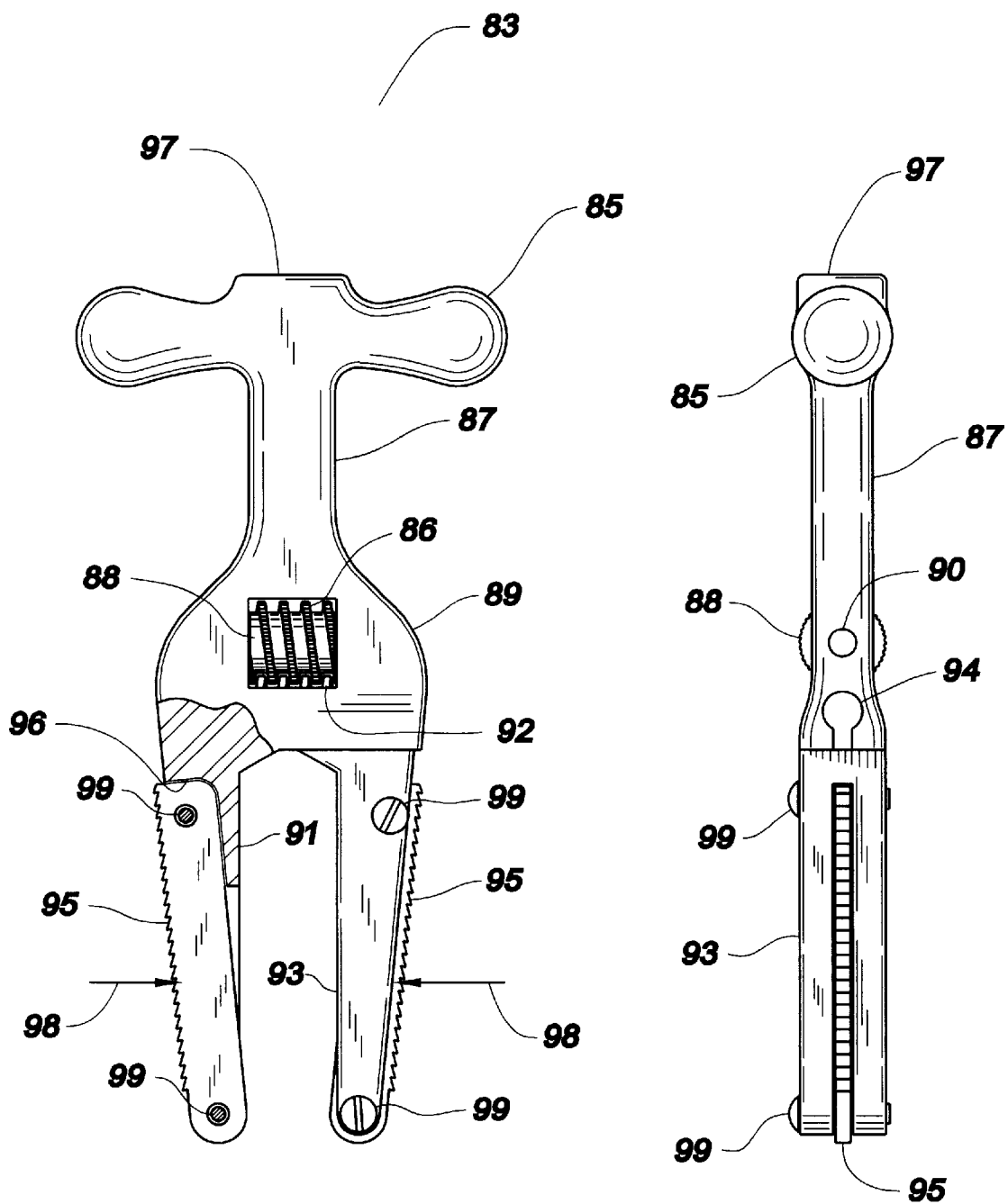
FIG. 5 is a front elevation view of a novel hacksaw blade tub tool wherein the hacksaw blade arms are adjustable in the manner of a helical wheel adjustment.
FIG. 5a is a side elevation of the novel tub tool shown in FIG. 5.

FIG. 5 shows such a novel hacksaw blade tub tool of a durable material such as steel wherein the hacksaw blade arms are adjustable in the manner of a helical wheel adjustment. Tub tool hacksaw blade arms are adjustable in the manner of a helical wheel adjustment. The blades are adjusted or set to touch the inner diameter of the strainer plug body. The tool is then struck with a hammer which causes the blades to score and cut through the strainer plug body. The blades can be adjusted out further and the tool struck again with a hammer to deepen the cut through the strainer-plug body for removal. Novel tool 83 consists primarily of handle 85, shank 87, body 89, stationary leg 91, and moveable leg 93. Blades 95 are mounted to arms 91 and 93 by means of screws 99. The blades are similar to a standard hacksaw blade. Rotation of serrated wheel 88, which is mounted on shaft 90 in body 89, causes arm 93 to slide closer to or farther away from stationary arm 91, which is an extension of body 89. As in a helical wheel adjustment, the moveable arm 93 is slidably mounted in slot 94 of body 89. Serrated wheel 88 is machined in the manner of a worm gear whose teeth 86 engage mating teeth 92 of a portion of moveable arm 93. This portion of moveable arm 93 is machined in the manner of a rack gear and is shaped so as to slide in slot 94 of body 89 whenever wheel 88 is rotated for adjustment. Wheel 88 is serrated in the manner of a helical wheel adjustment to provide purchase when the wheel is rotated, i.e., between thumb and forefinger. Pad 97 on the top of the tool is designed to be struck by a hammer to cause the hacksaw blades 95 of arms 91 and 93 to cut deeply into strainer drain plug 31. Slots 95 are cut part way through arms 91 and 93 to create pockets for the purpose of resisting the lateral forces 98 against blades 95 which arise under blows of the hummer. The tops of slots 95 may touch blades 96 to resist upward movement of the blades under blows of the hammer.

In use, the blades of novel tub tool 83 are adjusted or set to touch the inner diameter of the strainer plug body. The tool is then struck with a hammer that causes the blades to cut deeply into the strainer plug body. The blades can be adjusted out further and the tool struck again with a hammer to deepen the cut through the strainer plug body for removal. Novel tub tool 83 offers a very wide adjustment range and is capable of cutting completely through strainer plug body 31 with comparatively little effort.

Hammer pad 97 is not limited to novel tool 83 and could be incorporated into the novel tool 51 of FIG. 3 or the novel tool 65 of FIG. 4 to help deepen the cut. Likewise the configuration of slots 96 is not limited to novel tool 83 and could be incorporated into the novel tool 51 of FIG. 3 to better support blade 63.

FIGS. 6 and 6a show a novel cutter of a durable material such as steel wherein two arms with-cutter wheels are adjustable in the manner of a helical wheel adjustment. A cutter having two arms includes a cutter wheel at the base of each arm. The two arm cutter is adjustable to touch the inner diameter of the strainer plug body and then to be adjusted out further to deepen the cut through the strainer plug body for removal. Novel tool 101 consists primarily of handle 103, shank 105, body 107, stationary arm 109, and moveable arm 111. Cutters 123 are mounted at the ends of arms 109 and 111 by means of screws 125. Rotation of serrated wheel 113 that is mounted on shaft 119 in body 107 causes arm 111 to slide closer to or farther away from stationary arm 109, which is an extension of body 107. As in a helical wheel adjustment, the moveable arm 111 is slidably mounted in slot 121 of body 107. Serrated wheel 113 is machined in the manner of a worm gear whose teeth 115 engage mating teeth 117 of a portion of moveable arm 111. This portion of moveable arm 111 is machined in the manner of a rack gear and is shaped so as to slide in slot 121 of body 107 whenever wheel 113 is rotated for adjustment. Wheel 113 is serrated in the manner of a wrench to provide purchase when the wheel is rotated, i.e., between thumb and forefinger.

In use, the cutters of novel tub tool 101 are adjusted or set to firmly contact the inner diameter 33 of the strainer plug body 31 above threaded connection 42 as shown in FIG. 6. The tool then is rotated in either direction by means of handle 103, which causes cutter wheels 123 to cut into the inner diameter 33 of the strainer plug body 31. By repeatedly adjusting the cutters 123 outward by means of serrated wheel 113, and rotating novel tub tool 101 by means of handle 103, the cut in the inner diameter 33 of the strainer plug body 31 is deepened until the strainer plug body 31 is cut through for removal. The lower portion of strainer plug body 31 remains with the shoe elbow 5 of drain assembly 3, which is now easily removed from the bathtub 1, and is generally discarded.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

We claim:

1. A drain assembly removal tool, comprising:
    (a) a hand grip;
    (b) two prongs extending from said hand grip; and
    (c) an adjustable saw blade for cutting into a strainer plug body of a drain, said adjustable saw blade having a multi-position slot for mounting to at least one of said prongs.

2. The drain assembly removal tool of claim 1 wherein said means for cutting comprises a saw blade on each of said two prongs.

3. The drain assembly removal tool of claim 1 wherein said adjustable saw blade comprises means for providing a multi-position slot adjustment to contact said saw blade to said strainer plug body of said drain.

4. A drain assembly removal tool, comprising:
   (a) a hand grip;
   (b) two prongs extending from said hand grip; and
   (c) an adjustable saw blade for cutting into a strainer plug body of a drain, said adjustable saw blade having a serrated helical wheel for providing adjustment to contact said saw blade to said strainer plug body of said drain.

5. The drain assembly removal tool of claim 4 comprising an adjustable saw blade on each of said two prongs.

6. A drain assembly removal tool, comprising:
   (a) a hand grip;
   (b) two prongs extending from said hand grip; and
   (c) an adjustable cutter wheel for cutting into a strainer plug body of a drain, said adjustable cutter wheel having a serrated helical wheel for providing adjustment to contact said adjustble cutter wheel to said strainer plug body of said drain.

7. The drain assembly removal tool of claim 6 comprising a cutter wheel on each of said two prongs.

8. A method of manufacturing a drain removal tool comprising the steps of:
   (a) providing a hand grip;
   (b) providing two prongs extending from said hand grip: and
   (c) providing an adjustable saw blade having a multi-position slot for mounting to at least one of said prongs.

9. The method of manufacturing a drain removal tool as set forth in claim 8 wherein said providing an adjustable saw blade comprises providing a saw blade on each of said two prongs.

10. A method of manufacturing a drain removal tool comprising the steps of:
    (a) providing a hand grip;
    (b) providing two prongs extending from said hand grip; and
    (c) providing an adjustable saw blade attached to at least one of said prongs and having a serrated helical wheel for providing adjustment to contact said saw blade to a drain strainer plug body.

11. A method of manufacturing a drain removal tool as set forth in claim 10 further comprising a saw blade attached to both of said two prongs.

12. A method of manufacturing a drain removal tool comprising the steps of:
    (a) providing a hand grip;
    (b) providing two prongs extending from said hand grip; and
    (c) providing an adjustable cutter wheel attached to at least one of said prongs and a serrated helical wheel for providing adjustment to contact said cutter wheel to a drain strainer plug body.

13. A method of manufacturing a drain removal tool as set forth in claim 12 further comprising a cutter wheel attached to both of said two prongs.

14. A method of manufacturing a tool for removing a bathtub drain assembly comprising the steps of:
    (a) providing a hand grip;
    (b) providing two prongs extending from said hand grip;
    (c) providing a cutter wheel on each of said prongs for cutting into a strainer plug body of a bathtub drain by cutting means attached to at least one of said prongs; and
    (d) providing a serrated helical wheel for adjusting a cutting contact between said cutter wheel to said strainer plug body of said bathtub drain.

* * * * *